Figure 1:
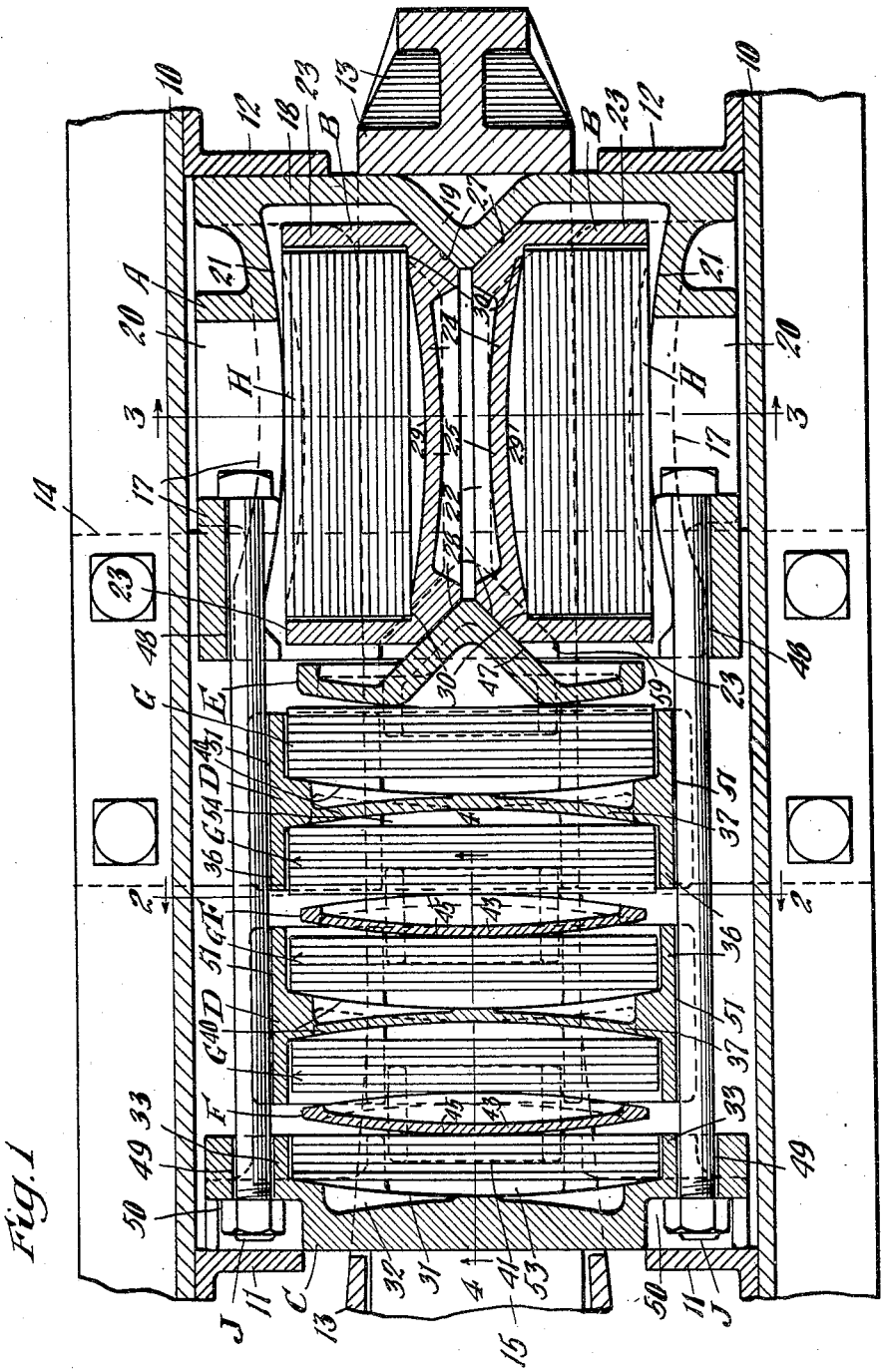

April 25, 1933.     S. B. HASELTINE     1,905,864
SHOCK ABSORBING MECHANISM
Filed Oct. 10, 1928     2 Sheets-Sheet 1

Witness
Wm. Geiger

Inventor
Stacy B. Haseltine
By Joseph Harris
His Atty.

April 25, 1933. S. B. HASELTINE 1,905,864
SHOCK ABSORBING MECHANISM
Filed Oct. 10, 1928 2 Sheets-Sheet 2
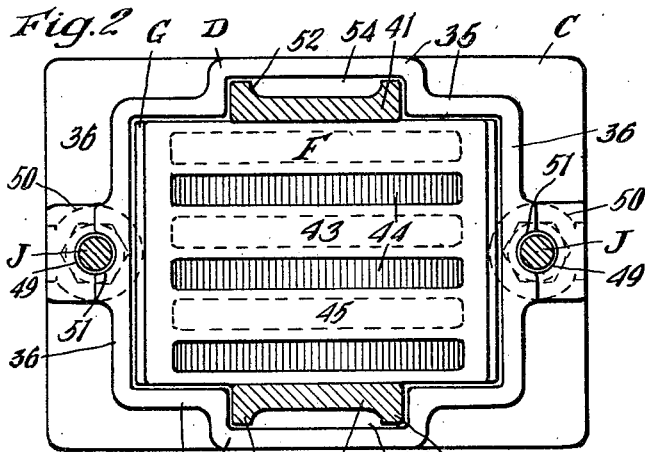
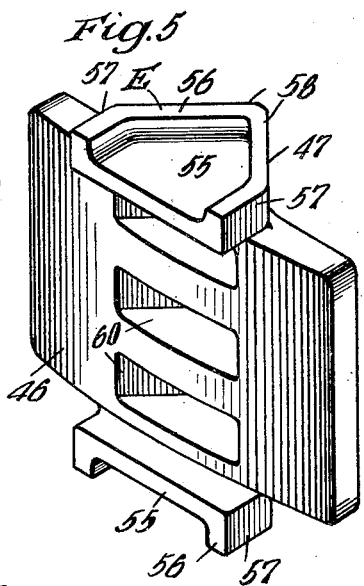
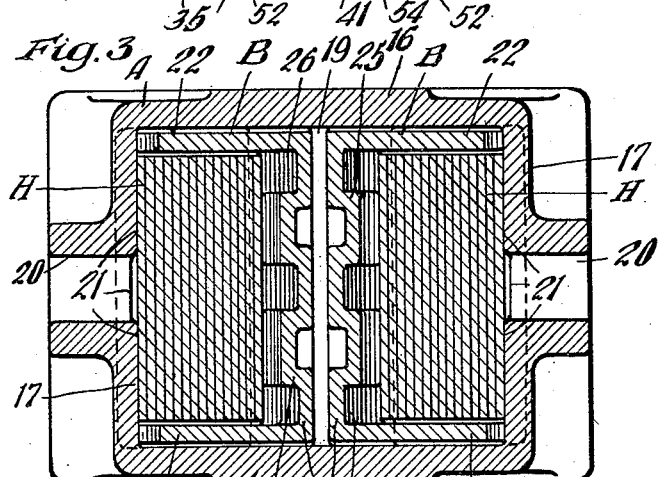
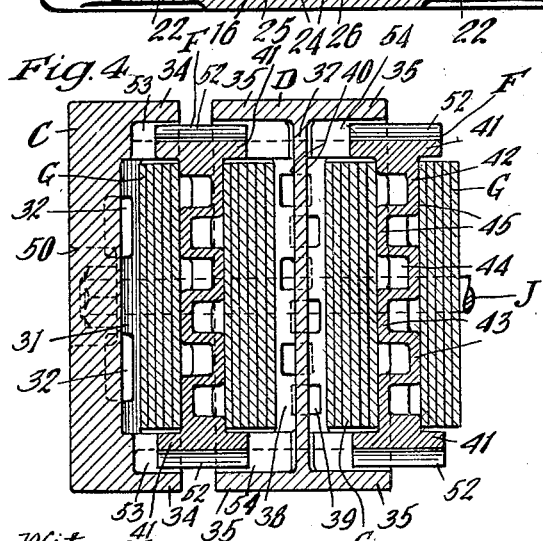
Inventor
Stacy B. Haseltine
By Joseph Harris
His Atty.
Witness
Wm. Geiger Patented Apr. 25, 1933

1,905,864

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

SHOCK ABSORBING MECHANISM

Application filed October 10, 1928. Serial No. 311,490.

This invention relates to improvements in shock absorbing mechanisms.

One object of the invention is to provide a shock absorbing mechanism, particularly adapted for passenger car equipment, wherein provision is made for a relatively light and easy cushioning capacity for the major part of the compression stroke and for an ultimate relatively high cushioning capacity during the latter part of a full compression stroke, to the end that a train of cars may be readily started, all ordinary shocks cushioned softly and a necessary reserve capacity available for unusually heavy shocks.

Another object of my invention is to provide a mechanism of the type above indicated, wherein the parts are so arranged that they are adapted to go solid at the end of the compression stroke internally, that is, through the medium of the spring followers and associated spring carriers and spacers, whereby the weight of the mechanism is kept at a minimum consistent with the desired ultimate capacity.

Another object of my invention is to provide a mechanism of the character indicated, wherein are employed sets of laminated spring plates and associated followers and spacers, the spacers and followers being provided with integral means for maintaining their alignment, thus eliminating the necessity of a heavy housing casting such as heretofore deemed necessary in mechanisms of this general class.

Another specific object of my invention is to so form the carriers for the sets of laminated spring plates as to eliminate relative longitudinal shift between the plates and the carriers and thus eliminate scoring while permitting the use of spring plates of inexpensive manufacture.

Other objects of the invention will more clearly appear from the description and claims hereinafter following.

In the drawings forming a part of this specification, Figure 1 is a horizontal, longitudinal, sectional view of a portion of a railway draft rigging, showing my improvements in connection therewith. Figures 2 and 3 are vertical, transverse, sectional views of the shock absorbing mechanism proper, corresponding to the lines 2—2 and 3—3, respectively, of Figure 1. Figure 4 is a partial, vertical, longitudinal, sectional view, corresponding to the line 4—4 of Figure 1. And Figure 5 is a detailed perspective view of a wedge follower employed in the mechanism.

In said drawings, 10—10 denote the usual channel draft sills of a car underframe, to the inner faces of which are secured front stop lugs 11 and rear stop lugs 12 of usual or desired construction. The shock absorbing mechanism proper is inserted within the opening of a cast hooded yoke 13, the latter and the shock absorbing mechanism being supported in operative position preferably by a saddle plate 14 detachably bolted to the lower flanges of the sills. The rear end of a coupler butt is indicated at 15.

The improved mechanism, as shown, preferably comprises a casing A; two wedge plate carriers B—B; a front follower C; a pair of plate carriers D—D; a wedge follower E; spacers F—F; a plurality of sets or groups of laminated plate springs G—G arranged transversely of the sills; two sets or groups of laminated spring plates H—H arranged longitudinally; and retainer bolts J—J.

The casing A is of generally hollow box-like form, having top and bottom walls 16—16, side walls 17—17 and rear wall 18. The rear wall 18 is provided with a forwardly projecting interior wedge 19 for the purpose hereinafter described. The side walls 17 are slotted, as indicated at 20—20 for the reception of the head of the retainer bolts J, the slots being such that the heads fit snugly therein and thus prevent turning of the bolts when the mechanism is assembled. On their inner faces, the side walls 17 are formed with convex surfaces 21—21 to cooperate with the spring plates H in flexing the latter, as hereinafter described.

The two wedge carriers B are of like construction and each is in the general form of a shallow box, having top and bottom flanges or wings 22—22, end walls 23—23, and a vertical inner wall or web 24, the latter, as clearly shown in Figure 3, being convoluted so as to provide alternate crests 25 and valleys 26. At each end, each carrier B is provided with wedge faces 27 and 28, the former cooperating with the wedge sections 19 of the casing A, as clearly indicated in Figure 1.

The convoluted vertical web 24 of each carrier B is also made concave longitudinally of the carrier, so that the inner surfaces 29 of the crest sections provide spaced concave bearing surfaces opposite the convex surfaces 21 of the casing A to induce flexing of the spring plates H when the carriers B are laterally separated, as hereinafter described. At the opposite ends of the concave surfaces 29, narrow flat ledges 30—30 are formed, and on which the ends of the spring plates normally bear. It will further be noted that all of the plates of each group or set H are confined entirely within the corresponding carrier B, and no appreciable longitudinal movement of the plates will occur with respect to the carrier, thus eliminating or minimizing possibility of scoring from any raw edges of the plates.

The front follower C is preferably in the form of a casting having a flat front bearing surface adapted to be directly engaged by the coupler, and on its inner face the follower C is formed with a concave surface 31, the latter being cored, as indicated at 32, to lessen the weight of the follower without destroying the effectiveness of the concave surface to induce flexing of the front set of spring plates G. At each end, the follower C is provided with a rearward extension 33 overlapping the ends of the spring plates of the front unit so as to maintain the latter in proper position and said extensions 33 are united by top and bottom transversely extending flanges 34—34, shown in Figure 4.

The carriers D are of like construction and each is formed with top and bottom walls 35—35 and vertical side walls 36—36, with an integral vertical partition or web 37, the latter being convoluted at opposite sides of the vertical center so as to present, when viewed from one side, alternate crests 38 and valleys 39. In addition to being convoluted, as above described, the web is so formed as to provide opposed concave bearing surfaces 40—40 on the respective crests, thus providing for flexing of the two sets of spring plates G on opposite sides of the web and which sets of plates are confined and supported entirely within the top, bottom and side walls of the carrier, as clear from inspection of Figure 1. With this construction, the spring plates are prevented from any appreciable longitudinal movement relative to the carriers and hence the possibility of scoring is correspondingly minimized.

The two spacers F—F are of like construction and each is formed with top and bottom sections 41—41 connected by an integral intervening web 42 which is convoluted or corrugated, as best shown in Figure 4, so as to provide alternate crests and valleys 43 and 44. The convoluted web section is further formed so as to provide forwardly and rearwardly facing convex bearing surfaces 45—45 adapted to engage with the sets of spring plates on opposite sides thereof, as will be clear from an inspection of Figure 1.

The wedge follower E is formed on its front side with a convex bearing surface 46 adapted to engage the corresponding adjacent spring plate and is further provided with a rearwardly projecting wedge section 47, the faces of which co-act with the adjacent wedge faces 28 of the carriers B.

The over-all length of the mechanism and predetermined initial compression of the springs are maintained by the bolts J, the heads of which are received in the slots 20 of the casing A, as hereinbefore described, said bolts being entered laterally from the interior of the casing A within recesses 48—48 formed on the inner faces of the front portions of the side walls of the casing A. The outer ends of the bolts J pass through suitable openings 49 in the front follower C, the nuts being applied to the bolts and disposed within recesses 50 of the follower C. To assist in maintaining the carriers D in proper position and to provide clearance for the bolts J, said carriers D are provided with longitudinal grooves 51—51 on the outer sides of the end walls thereof, said grooves providing a sliding connection for the carriers relative to the bolts J.

To maintain the alignment of the followers, transversely disposed spring carriers and spacers, the following means are employed: Each of the spacers F—F is provided on the top and bottom thereof with a pair of laterally spaced ribs 52. The front follower C and each of the carriers D are provided with corresponding, longitudinally extending grooves or recesses 53 and 54, respectively, within which slide the said ribs 52 and by which the latter are guided, thus permitting relative movement between the follower, spacers and carriers longitudinally of the mechanism while preventing lateral shift therebetween. The wedge follower E, as best shown in Figure 5, is also provided at the top and bottom thereof with a forwardly and rearwardly extended flange 55 of generally triangular shape and around the periphery of which are upwardly and downwardly projecting ribs 56—56, each of the latter having two side straight sections 57—57 and two converging sections 58—58.

The straight sections 57 are received and slide within the corresponding adjacent grooves 54 of the carrier D. The rearwardly projecting triangular sections of the flanges and rib sections 58—58 are received and are slidable within correspondingly shaped recesses 59—59 provided on the interior faces of the top and bottom walls 16 of the casing A, it being observed that sufficient clearance is left between the said triangular sections of the follower E and the shoulders defining the recesses 59 to permit the necessary longitudinal movement of the follower E inwardly relative to the casing A and ultimately to limit its movement with respect thereto. With this construction, it is evident that the alignment of the rear carrier D and follower E is maintained, and also alignment between the follower E and the casing A. Again referring to Figure 5, it will be noted that the follower E is cored, as indicated at 60, so as to lessen the weight without destroying the effectiveness of the convex surface for flexing the adjacent group of spring plates.

The spring plates in each instance are preferably of rectangular form and, due to the fact that the same are confined within flanges or walls of the respective carriers and that the ends of the plates have practically no movement relative thereto, the edges of the plates may be left raw, thus reducing the cost of manufacture.

The operation of the mechanism is as follows, assuming a compression buff stroke. As the follower C is moved rearwardly by the coupler, the first action will be a gradual flexing of all of the transversely arranged sets of spring plates G, the flexing of each group obviously taking place between a pair of opposed convex and concave surfaces. During the greater part of the compression stroke, there will be no appreciable flexing of the spring plates H, due to the fact that a greater force is required to flex the heavy sets by reason of the wedge action necessary and the friction set up between the sets of wedge faces. As the compression stroke continues, there will be a gradual merging, toward the latter end of the stroke, between the flexing of the transverse plates and the longitudinally arranged plates, this action occurring as the follower E is gradually and slowly forced rearwardly, thus producing a separation of the carriers B and at the same time inducing a relative longitudinal movement of the latter with respect to the casing A. As the carriers B are separated, obviously the spring plates H will be flexed between the opposed sets of concave and convex bearing surfaces 29 and 21, and simultaneously there will be a slippage of the plates longitudinally with reference to the convex surfaces 21. On a full stroke, the forward end of the mechanism is arranged to go solid through the follower C, spacers F, follower E, the webs of the carriers D, and the spring plates G, when the latter are in full engagement with the corresponding sets of opposed curved surfaces of the followers, spacers and carriers. Within the casing A, the parts are so proportioned that, at the end of a full compression stroke, the rear end walls 23 of the carriers B will engage the rear wall 18 of the casing A, the follower E will be brought up against the shoulders of the recesses 59 in the casing A, and the laterally extended portions of the follower E will engage the front end walls of the carriers B.

By having the follower C and carriers D provided with integral means for maintaining their alignment, it is obvious that I eliminate the necessity for a heavy casing or housing for the transversely extended spring plates and thus keep the weight of the mechanism down to a minimum. In actual practice, the capacities will be such that there will be no appreciable action of the longitudinally disposed spring plates during the first 1¾ inches travel, the longitudinally disposed plates being primarily intended to function in absorbing unusual or heavy blows during the last ¾ inch travel of the stroke, although there will obviously be a merging from the one action to the other to a slight extent. With this arrangement only the transversely disposed spring plates are brought into action for any normal shocks incident to starting or stopping a train and while running, thus minimizing wear on the friction parts, as will be obvious. In release, it is evident that the transversely extended spring plates are free to straighten out and restore the follower C and carriers D to their normal position, and, should the longitudinally disposed plates H have been actuated, the stored-up energy therein is sufficient to restore the carriers B and follower E to their normal position.

While I have herein shown and described what I consider the preferred manner of carrying out my invention, the same is merely illustrative and I contemplate all changes and modifications which come within the scope of the claims appended hereto.

I claim:

1. In a shock absorbing mechanism, the combination with a plurality of sets of laminated spring plates; of follower elements at opposite ends thereof; spacer elements between said sets; and cooperating means on the follower elements and spacer elements for maintaining the same in alignment while permitting relative approach thereof, said means comprising slidable interfitting means on adjacent elements including a laterally projecting tongue on one of said elements and a cooperating grooved guide on the next adjacent element receiving and closely fitting said tongue throughout its length for sliding movement.

2. As an article of manufacture, a spacer for spring plates, said spacer having a wall, adjacent sections of which are offset with respect to each other and presenting curved faces on opposite sides of said spacer, of alternate crest and valley formation.

3. In a shock absorbing mechanism, the combination with a casing; of laterally movable carriers having end wedge faces disposed within said casing; a group of laminated spring plates in each of said carriers; wedge means on the casing, cooperable with the wedge faces at one end of said carriers; and a wedge at the opposite end of said carriers, cooperable with the corresponding adjacent wedge faces thereof, said casing having seats corresponding in shape to the wedge, within which the wedge enters and whereby the same is centered with respect to the casing.

4. In a shock absorbing mechanism, the combination with a casing; of laterally movable carriers within said casing; sets of laminated spring plates carried by said carriers; a follower adjacent one end of said carriers, said follower and casing having wedge means for effecting lateral movement of the carriers; a second follower; a plurality of transversely disposed sets of laminated spring plates, spacers and carriers, interposed between said two followers; and retainer bolts extended between said casing and second named follower, said last named carriers and bolts having slidable engagement.

5. As an article of manufacture, a rigid spacer for spring plates, said spacer having a continuous main web alternately offset in opposite directions and presenting alternated bearing surfaces respectively at opposite sides of said spacer.

6. As an article of manufacture, a carrier for plate springs, said carrier having top and bottom walls and a rigid connecting wall, said connecting wall being continuous and having adjacent sections thereof offset in opposite directions, said offset sections having the outer faces thereof curved transversely of the spacer, thereby presenting alternate faces on opposite sides of the spacer, said faces at each side of the spacer being in vertical alignment.

7. As an article of manufacture, a spacer for spring plates, said spacer having forwardly and rearwardly projecting tongues of lesser width than the spacer and of uniform width throughout their length adapted to cooperate with grooves in corresponding adjacent members, said tongues slidably fitting said grooves and being of substantially uniform width throughout their length.

In witness that I claim the foregoing I have hereunto subscribed my name this 8th day of October, 1928.

STACY B. HASELTINE.